(12) United States Patent
Spackman

(10) Patent No.: US 8,244,992 B2
(45) Date of Patent: Aug. 14, 2012

(54) POLICY BASED DATA RETRIEVAL PERFORMANCE FOR DEDUPLICATED DATA

(76) Inventor: Stephen P. Spackman, San Jose, CA (US)

( * ) Notice: Subject to any disclaimer, the term of this patent is extended or adjusted under 35 U.S.C. 154(b) by 197 days.

(21) Appl. No.: 12/785,760

(22) Filed: May 24, 2010

(65) Prior Publication Data

US 2011/0289281 A1     Nov. 24, 2011

(51) Int. Cl.
- *G06F 12/00* (2006.01)
- *G06F 3/00* (2006.01)
- *G06F 5/00* (2006.01)

(52) U.S. Cl. ........... 711/154; 707/813; 710/58; 710/60

(58) Field of Classification Search .......... 707/813; 710/58, 60; 711/154
See application file for complete search history.

(56) References Cited

U.S. PATENT DOCUMENTS

| | | | |
|---|---|---|---|
| 5,990,810 A | 11/1999 | Williams | |
| 2011/0040951 A1* | 2/2011 | Akirav et al. | 712/4 |
| 2011/0055171 A1* | 3/2011 | McNutt | 707/692 |
| 2011/0055471 A1* | 3/2011 | Thatcher et al. | 711/114 |
| 2011/0066666 A1* | 3/2011 | Takaoka et al. | 707/816 |

* cited by examiner

*Primary Examiner* — Kevin L Ellis
*Assistant Examiner* — Mehdi Namazi

(57) ABSTRACT

A method that includes, by one or more computer systems, determining a data retrieval rate policy based on at least one data retrieval rate parameter. The method also includes determining at least one storage subsystem performance parameter. The method further includes determining a fragmentation value based on the data retrieval rate policy and the at least one storage subsystem performance parameter. The method additionally includes determining a storage subsystem fragmentation of a first data object. The storage subsystem fragmentation includes fragmenting the first data object into a plurality of first data object fragments. The method also includes deduplicating the first data object based on the fragmentation value and the storage subsystem fragmentation.

21 Claims, 2 Drawing Sheets

POLICY BASED DATA RETRIEVAL PERFORMANCE FOR DEDUPLICATED DATA

TECHNICAL FIELD

This disclosure relates generally to deduplicating data.

BACKGROUND

At least two determinants of input/output (I/O) performance for a storage system are the available data transfer rate and the latency of data access. The latter may be relevant even for large files because it may not be possible to store them in a single linear arrangement. Rather, for various practical reasons, the file may be fragmented into pieces that are stored in disparate locations on a disk (or disk array). Reading or writing each fragment to the storage medium involves an amount of time to physically move the disk's head to the start of the new fragment. This may be referred to as a "seek penalty". This overhead is exacerbated in deduplicated storage systems in which newly stored data blocks for which copies already exist in the system are replaced by references to the previously stored copies. This means that the number of fragments encountered during a linear read of a stored object is determined not only by the constraints imposed by the storage subsystem, but also by the extent that data can be deduplicated. In many instances, improvements in the deduplication effectiveness improve the effectiveness of data compression but result in degradation of the retrieval performance. This is at least partly due to the fact that, at least for current technology disks, seeking to data is more of a bottleneck than transferring a sequential data block.

DESCRIPTION OF EXAMPLE EMBODIMENTS

Figure 1:
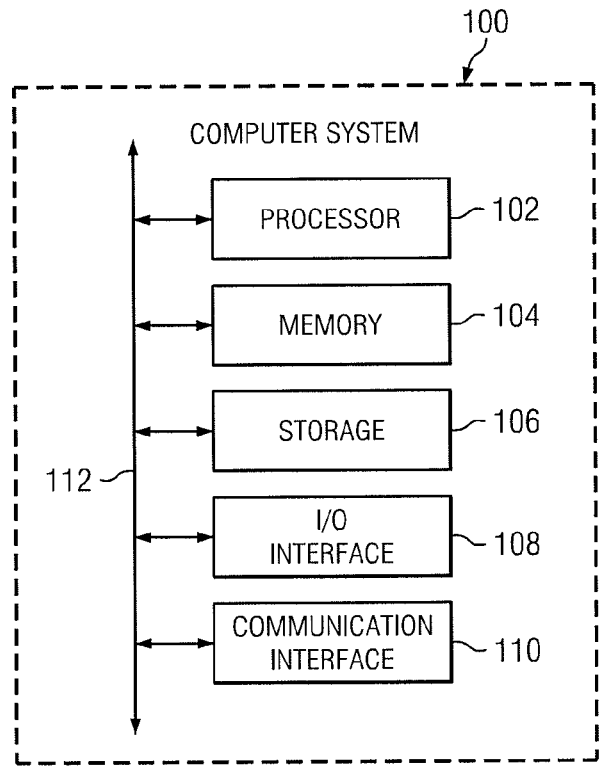
FIG. 1 illustrates an example computer system, in accordance with particular embodiments.

Certain embodiments may provide data compression through data deduplication that takes into account a specified data retrieval rate. In particular embodiments, the performance penalty, caused by fragmenting a data object as part of the storage and deduplication processes, may be isolated and exposed as a dynamically controllable matter of policy. For example, in particular embodiments, a deduplication engine may determine an available amount of excess read capacity based on a suitable data retrieval rate policy and the performance characteristics of a disk array. The excess read capacity may, among other things, take into account the number and pattern of fragments that are created by the storage system as well as the amount by which the storage system is faster than the specified suitable data retrieval rate. The excess read capacity may be indicative of the amount of time that is available for performing inter-fragment seeks while still meeting the user requirement. In particular embodiments, the excess read capacity may be divided by the time (e.g., an estimated or typical worst case scenario) to complete a seek operation to determine a maximum fragmentation rate consistent with the user requirement. Some embodiments may use this information to limit the deduplication induced fragmentation rate of a stored data object so as to provide a suitable data retrieval rate.

In particular embodiments, the deduplication engine may use a suitable data retrieval rate policy and information about storage subsystem performance to compute a suitable deduplication rate. The data retrieval rate policy may be based on one or more parameters provided by a user (e.g., a system administrator), a company (e.g., the company providing deduplication), a supplier (e.g., the supplier providing the equipment used in deduplication), or any other user or entity that may want to ensure at least one aspect of data retrieval. The deduplication rate may be used in determining when and how a data object is deduplicated. For example, when storing a data object, deduplication candidates may be bypassed when there is little or no available excess read capacity. This may increase the data retrieval rate while reducing the amount of compression.

In some embodiments, the deduplication engine may determine the cost of each seek that would be incurred if a deduplication opportunity were exercised. Then, an opportunity would be declined if there is insufficient excess read capacity remaining and the associated data would be stored in linear fashion. Conversely, if there is capacity available, the opportunity is exercised, and the budget is correspondingly reduced for the associated retrieval overhead. In some instances, a deduplication opportunity or sequence of deduplication opportunities may involve a fragment of data that is surrounded on both sides by data that may not be deduplicated. In such an instance, deduplicating the fragment of data may incur two costs, one to seek to the deduplicated data, and one to seek back. In some embodiments, a cap is maintained so that fragmentation 'credit' does not accumulate without bound (e.g., a file that meets performance parameters that are maintained only on average, with high performance at the start of the file, may be vitiated by extreme fragmentation at the trailing extremity).

In particular embodiments, a sliding window (e.g., corresponding to the excess read capacity) may be maintained during deduplication. Decisions about whether or not to take deduplication opportunities are deferred until the window is full. The excess read capacity may then be systematically allocated to the deduplication opportunities in order of compression payoff (e.g., the longest contiguous deduplication opportunities are given highest priority). In some embodiments, the physical layout (e.g., the physical distance and similar performance impacting considerations of the seeks between fragments) of where data is stored may be taken into consideration. This may allow for more accurate estimates of the temporal costs of the individual fragmentations. In certain scenarios, the deduplicated data itself may need to be fragmented (e.g., a maximum length to a fragment independent of whether deduplication occurs or not). This additional fragmentation may be factored into the budget.

FIG. 1 illustrates an example computer system 100. In particular embodiments, one or more computer systems 100 perform one or more steps of one or more methods described or illustrated herein. For example, in certain embodiments, computer system 100 may take into account data retrieval parameters (e.g., user provided constraints and storage system limitations) in determining how or when data is deduplicated. Depending on the scenario, this may involve computer system 100 checking to determine whether deduplicating a particular sub-block of data would cause later data retrieval to exceed data retrieval constraints provided by a user. In particular embodiments, one or more computer systems 100 provide functionality described or illustrated herein. In particular embodiments, software running on one or more computer systems 100 performs one or more steps of one or more methods described or illustrated herein or provides functionality described or illustrated herein. Particular embodiments include one or more portions of one or more computer systems 100.

This disclosure contemplates any suitable number of computer systems 100. This disclosure contemplates computer system 100 taking any suitable physical form. As an example and not by way of limitation, computer system 100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 100 may include one or more computer systems 100; be unitary or distributed; span multiple locations; span multiple machines; or reside in a cloud, which may include one or more cloud components in one or more networks. Where appropriate, one or more computer systems 100 may perform without substantial spatial or temporal limitation one or more steps of one or more methods described or illustrated herein. As an example and not by way of limitation, one or more computer systems 100 may perform, in real time or in batch mode, one or more steps of one or more methods described or illustrated herein. One or more computer systems 100 may perform at different times or at different locations one or more steps of one or more methods described or illustrated herein, where appropriate.

In particular embodiments, computer system 100 includes processor 102, memory 104, storage 106, I/O interface 108, communication interface 110, and bus 112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. The present disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. The present disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, computer system 100 may load instructions from storage 106 or another source (such as, for example, another computer system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, dynamic RAM (DRAM) or static RAM (SRAM). Moreover, where appropriate, this RAM may be single-ported or multi-ported RAM. The present disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a semiconductor-based or other integrated circuit (IC) (such, as for example, a field-programmable gate array (FPGA) or an application-specific IC (ASIC)), a hard disk drive (HDD), a hybrid hard drive (HHD), a floppy disk, a floppy disk drive (FDD), flash memory, an optical disc, an optical disc drive (ODD), a magneto-optical disc, a magneto-optical drive, magnetic tape, a magnetic tape drive, a Universal Serial Bus (USB) drive, a holographic storage medium, a solid-state drive (SSD), a RAM-drive, a SECURE DIGITAL card, a SECURE DIGITAL drive, a flash card, a flash drive, or any other suitable computer-readable storage medium or a combination of two or more of these, where appropriate. Storage 106 may include removable or non-removable (or fixed) media, where appropriate. Storage 106 may be internal or external to computer system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both providing one or more interfaces for communication between computer system 100 and one or more I/O devices. Computer system 100 may include one or more of these I/O devices, where appropriate. One or more of these I/O devices may enable communication between a person and computer system 100. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between computer system 100 and one or more other computer systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, computer system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or any other suitable wireless network or a combination of two or more of these. Computer system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of computer system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-E) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Herein, reference to a computer-readable storage medium encompasses one or more tangible computer-readable storage media possessing structures. As an example and not by way of limitation, a computer-readable storage medium may include a semiconductor-based or other IC (such, as for example, an FPGA or an ASIC), an HDD, an HHD, a floppy disk, an FDD, flash memory, an optical disc, an ODD, a magneto-optical disc, a magneto-optical drive, magnetic tape, a magnetic tape drive, a USB drive, a holographic storage medium, an SSD, a RAM-drive, a SECURE DIGITAL card, a SECURE DIGITAL drive, a flash card, a flash drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 102 (such as, for example, one or more internal registers or caches), one or more portions of memory 104, one or more portions of storage 106, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Figure 2:
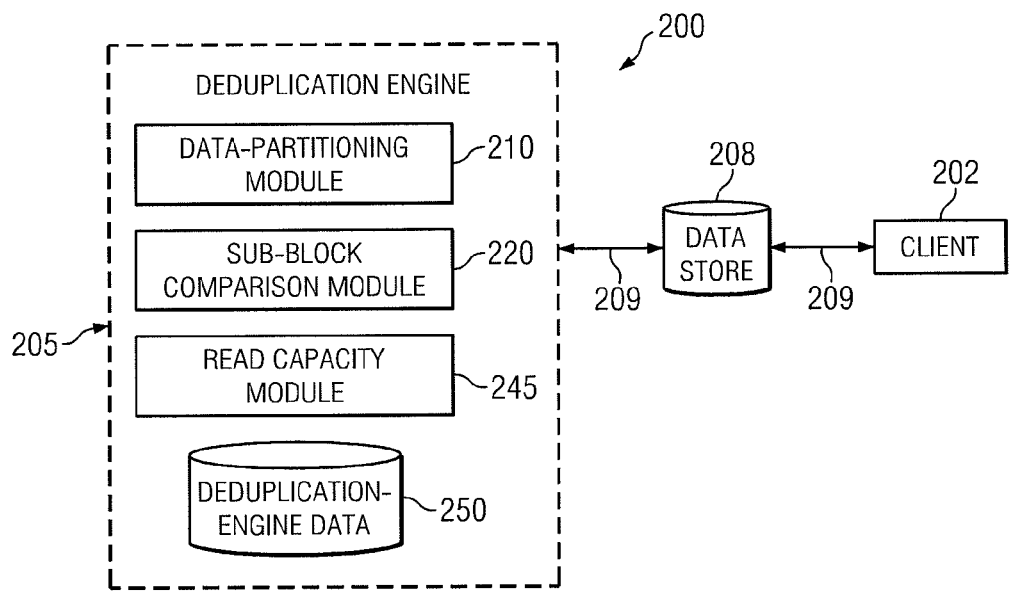
FIG. 2 illustrates an example system for deduplicating data that accounts for data retrieval rate parameters, in accordance with particular embodiments.

FIG. 2 illustrates an example system 200 for deduplicating data that accounts for data retrieval rate parameters. System 200 includes a client 202, a deduplication engine 205, and a data store (or storage subsystem) 208. One or more links 209 couple client 202 to data store 208, and one or more links 209 couple deduplication engine 205 to data store 208. While data store 208 is depicted as being logically between client 202 and deduplication engine 205, in some embodiments or scenarios deduplication engine 205 may be logically between client 202 and data store 208.

In particular embodiments, one or more links 209 each include one or more buses, wireline links, wireless links, or optical links. In particular embodiments, one or more links 209 each include a virtual private network (VPN), a local area network (LAN), a wireless LAN (WLAN), a wide area network (WAN), a metropolitan area network (MAN), a portion of the Internet, or another link 209 or a combination of two or more such links 209. In particular embodiments, link 209 may include one or more links. The present disclosure contemplates any suitable links 209. One or more links 209 coupling client 202 to data store 208 may differ in one or more respects from one or more links 209 coupling deduplication engine 205 to data store 208. Although this disclosure describes and illustrates a particular arrangement among a particular client 202, a particular deduplication engine 205, a particular data store 208, and particular links 209, this disclosure contemplates any suitable arrangement among any suitable client 202, any suitable deduplication engine 205, any suitable data store 208, and any suitable links 209. As an example and not by way of limitation, instead of or in addition to one or more links 209 coupling client 202 to data store 208, one or more links 209 may couple client 202 to deduplication engine 205. Client 202, deduplication engine 205, and data store 208 may be located at a single physical location or at multiple physical locations.

As described above, deduplication engine 205 may include a hardware or encoded software element (such as, for example, a computer program) or a combination of two or more such elements that algorithmically perform data deduplication. This disclosure contemplates any suitable programming language for any suitable computer program for data deduplication, where appropriate. This disclosure contemplates any suitable number and type of computer systems executing any suitable computer program for data deduplication, where appropriate. Each of the computer systems may be unitary or distributed, where appropriate, and a distributed computer system may span multiple computer systems or multiple datacenters, where appropriate. Deduplication engine 205 may include one or more deduplication engines 205.

In particular embodiments, deduplication engine 205 provides in-line deduplication. As an example and not by way of limitation, deduplication engine 205 may deduplicate data 100 from client 202 as client 202 or another device stores data 100 at data store 208, which may provide back-up or other storage for client 202. In particular embodiments, deduplication engine 205 provides post-process deduplication in addition or as an alternative to in-line deduplication. As an example and not by way of limitation, deduplication engine 205 may access data 100 stored at data store 208 (which client 202 or another device may have stored at data store 208 without having data deduplication performed on it) and then deduplicate and re-store it. In particular embodiments, deduplication engine 205 may assist in re-creating data 100 stored at data store 208 when client 202 accesses it. In both instances, deduplication engine 205 may take into account the data retrieval rate (e.g., bits per second that can be retrieved by client 202) specified by the data retrieval rate policy.

In particular embodiments, deduplication engine 205 includes a data-partitioning module 210, a sub-block comparison module 220, and a read capacity module 245. Data-partitioning module 210, sub-block comparison module 220, and read capacity module 245 may each include a hardware or encoded software element or a combination of two or more such elements that provide particular functionality for data deduplication. In particular embodiments, data-partitioning module 210 partitions data (e.g., data object D1 or data blocks B1-B7) into sub-blocks (e.g., sub-blocks SB1-SB7). In some embodiments, fingerprints may be created for the partitioned data. In particular embodiments, sub-block comparison module 220 determines whether a sub-block is identical or similar to one or more other sub-blocks. In particular embodiments, read capacity module 245 determines whether there is available read capacity to deduplicate sub-blocks identified by comparison module 220 as being similar or identical to other sub-blocks.

In particular embodiments, data-partitioning module 210, sub-block comparison module 220 and read capacity module 245 are functionally, logically, or physically separate from each other. As an example and not by way of limitation, data-partitioning module 210 may have its own hardware or software elements, distinct from those of each of sub-block comparison module 220 and read capacity module 245. In particular embodiments, two or more of data-partitioning module 210, sub-block comparison module 220, and read capacity module 245 are functionally, logically, or physically combined with each other, where appropriate. As an example and not by way of limitations, two or more of data-partitioning module 210, sub-block comparison module 220, and read capacity module 245 may share one or more of their hardware or software elements with each other.

Data-partitioning module 210, sub-block comparison module 220, and read capacity module 245 may access (e.g., write to or read from) deduplication-engine data 250 as needed to provide their functionality. Deduplication-engine data 250 may include one or more data retrieval rate parameters, one or more differences calculated between similar sub-blocks, one or more indexes, and/or other suitable deduplication-engine data 250. One or more portions of deduplication-engine data 250 may be internal to deduplication engine 205, where appropriate. One or more portions of deduplication-engine data 250 may be external to deduplication engine 205, where appropriate. This disclosure contemplates deduplication-engine data 250 being stored in any suitable manner using any suitable memory.

Depending on the embodiment and/or scenario, deduplication engine 205 may use a data structure known as a primary index to store signature values (such as hash values) that are associated with sequences of data being stored. These sequences of data (known as sub-blocks) may be smaller portions of a larger file, data stream, or other data object. Copies of unique sub-blocks may be stored in a repository, which may reside on a HDD, in a storage area network (SAN), or in other mass storage components. The deduplication engine may use the primary index to store a pointer to an address (or location) in the repository to point from the signature of a sub-block to the actual storage location of the sub-block associated with it. Herein, reference to a signature encompasses a signature value, and vice versa, where appropriate. Herein, reference to a deduplication engine encompasses a hardware or encoded software element (such as, for example, a computer program) or a combination of two or more such elements that algorithmically perform data deduplication, where appropriate. In some embodiments, there may be multiple indexing mechanisms, involving one or more levels of to reach the data. For example, certain embodiments may comprise an architecture with an indirect index that takes a hash value to a sequence memory page. These sequence memory pages may themselves be linked together in various ways by local sub-indexes.

In particular embodiments, during deduplication, deduplication engine 205 may replace a sub-block that is to be deduplicated with a sub-block signature value and associated pointer to the duplicate data in the sub-block that is already stored. The associated pointers may be pointers from signature values to addresses in a repository where the data in the sub-blocks is stored. In particular embodiments, hash-based deduplication is a method of data deduplication that involves segmenting data into variable or fixed-sized sub-blocks, calculating the hash of each of the sub-blocks, and matching identical sub-blocks by their hashes. U.S. Pat. No. 5,990,810, issued 23 Nov. 1999 to Ross. N. Williams, incorporated herein by reference as an example and not by way of limitation, discloses example hash-based deduplication. In particular embodiments, file differencing is a method of data deduplication that involves calculating a series of fingerprints of each file and matching files based on the number of fingerprints they have in common. Once two files have been found that are similar, the old copy is read and the new copy is stored as a difference. Udi Manber, *Finding Similar Files in a Large File System*, USENIX WINTER 1994 TECHNICAL CONFERENCE PROCEEDINGS, San Francisco, Calif., Jan. 17-21, 1994, incorporated herein by reference as an example and not by way of limitation, discloses example file differencing. Herein, reference to file differencing encompasses sub-block differencing, where appropriate.

In particular embodiments, deduplication engine 205 may segment data for deduplication into variable-sized sub-blocks, as U.S. Pat. No. 5,990,810 discloses. This may be done before, after, or concurrently with the segmentation done based on the storage system. Thus, depending on the embodiment, the data that is being segmented for deduplication may be the data object (e.g., data object D1) that is to be stored in data store 208, or it may be the data blocks (e.g., data blocks B1-B7) segmented from the data object to comply with the storage parameters of data store 208. Deduplication engine 205 may then determine if there already exists an identical or similar sub-block. For example, in some embodiments, deduplication engine 205 may identify identical sub-blocks by calculating a hash (which in particular embodiments may be known as a sub-block hash) of the sub-block and comparing it to an index containing hashes of other sub-blocks. As another example, deduplication engine 205 may determine if a similar sub-block is present using fingerprints associated with the sub-block. Particular embodiments may use any of a variety of known techniques for identifying identical or similar sub-blocks. Because deduplicating the identical or similar sub-block will result in fragmenting the data object, if an identical or similar sub-block is found, deduplication engine 205 may determine whether there is sufficient excess read capacity available to perform the corresponding deduplication.

Figure 3:
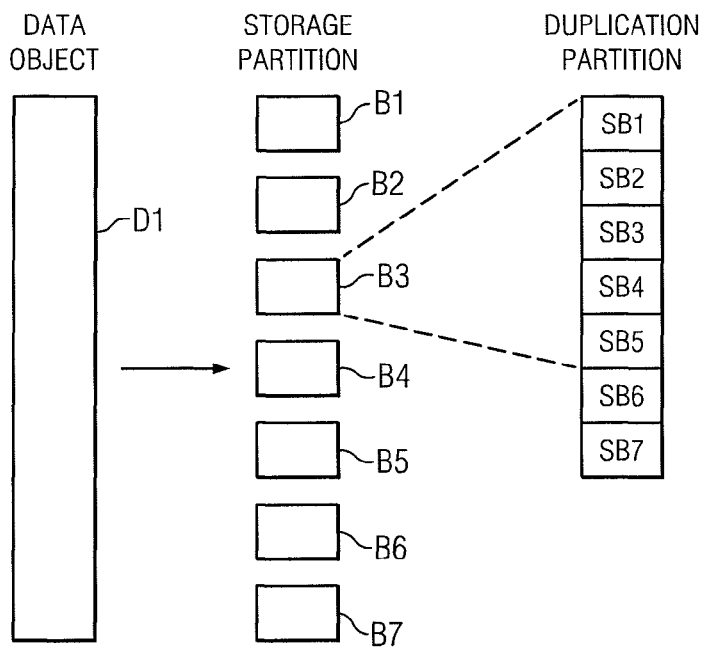
FIG. 3 illustrates an example fragmentation of a data object into storage system based blocks and potential deduplication based sub-blocks, in accordance with particular embodiments.

FIG. 3 illustrates an example fragmentation of data object D1 into storage system based blocks B1-B7 and deduplication sub-blocks SB1-SB7. Although this disclosure describes and illustrates particular partioning of particular data object D1 into particular blocks B1-B7 and potential sub-blocks SB1-SB7, this disclosure contemplates any suitable partitioning of any suitable data into any suitable blocks and/or sub-blocks. The file system used to store data object D1 may have limits on the size (e.g., in bits) of data blocks that can be stored sequentially. In scenarios in which data object D1 is greater in size than the file system limits, it may be suitable to fragment data object D1 into smaller blocks B1-B7. A deduplication engine may then partition each block B1-B7 into a plurality of sub-blocks. For example, block B3 has been partitioned into seven sub-blocks SB1-SB7. Each partition may result in a fragmentation of data object D1. The deduplication engine may determine which of sub-blocks SB1-SB7 are identical or similar to any other sub-blocks, either from within data object D1 or from any other known data object. The deduplication engine may use signature values, such as hash values, to determine which of sub-blocks SB1-SB7 are identical or similar to other sub-blocks. These sub-blocks may be potential candidates for deduplication. The deduplication engine may assess, for example, the amount of fragmentation that has already occurred and the data retrieval rate policy to determine whether a matching sub-block can be deduplicated.

The size of sub-blocks SB1-SB7 may vary based on a balance between system performance and data compression. A relatively large mean sub-block size may reduce the number of sub-blocks and therefore reduce the number of potential fragments. This may improve performance, but may reduce the space efficiency of the data deduplication. A relatively small mean sub-block size may facilitate a higher degree of data deduplication. However, a smaller mean sub-block length size require the use of more fragments. Therefore, using a smaller mean sub-block length may reduce performance but increase the space efficiency of the data deduplication.

Although the present disclosure describes and illustrates determining whether sub-blocks are identical by looking up corresponding hash values in an index, the present disclosure contemplates any suitable method for determining whether sub-blocks are identical (as an alternative or in addition to determining whether sub-blocks are identical by looking up corresponding hash values in an index). As an example and not by way of limitation, the deduplication engine may compare data associated with the sub-blocks to determine whether they are identical. In particular embodiments, the deduplication engine also determines whether non-identical sub-blocks are similar. In particular embodiments, the deduplication engine may use fingerprints to determine whether non-identical sub-blocks are "similar." In particular embodiments, the deduplication engine may treat two non-identical sub-blocks as "similar" if a certain minimum percentage (such as, for example, at least approximately 75%) of the fingerprints associated with them are the same. The deduplication engine may calculate a difference between similar sub-blocks and use the difference later to re-create one or both of the sub-blocks.

Although the present disclosure describes and illustrates partitioning data object D1 into blocks B1-B7 and partitioning data block B3 into sub-blocks SB1-SB7, it is not necessary that the partitioning be performed in this manner. For example, data object D1 may be partitioned into sub-blocks irrespective of or concurrently with the partitioning of data object D1 into data blocks B1-B7. The deduplication may be performed for purposes of backing-up data, transmitting data, storing data that is not backed-up, or any other suitable purpose or combination of purposes.

Figure 4:
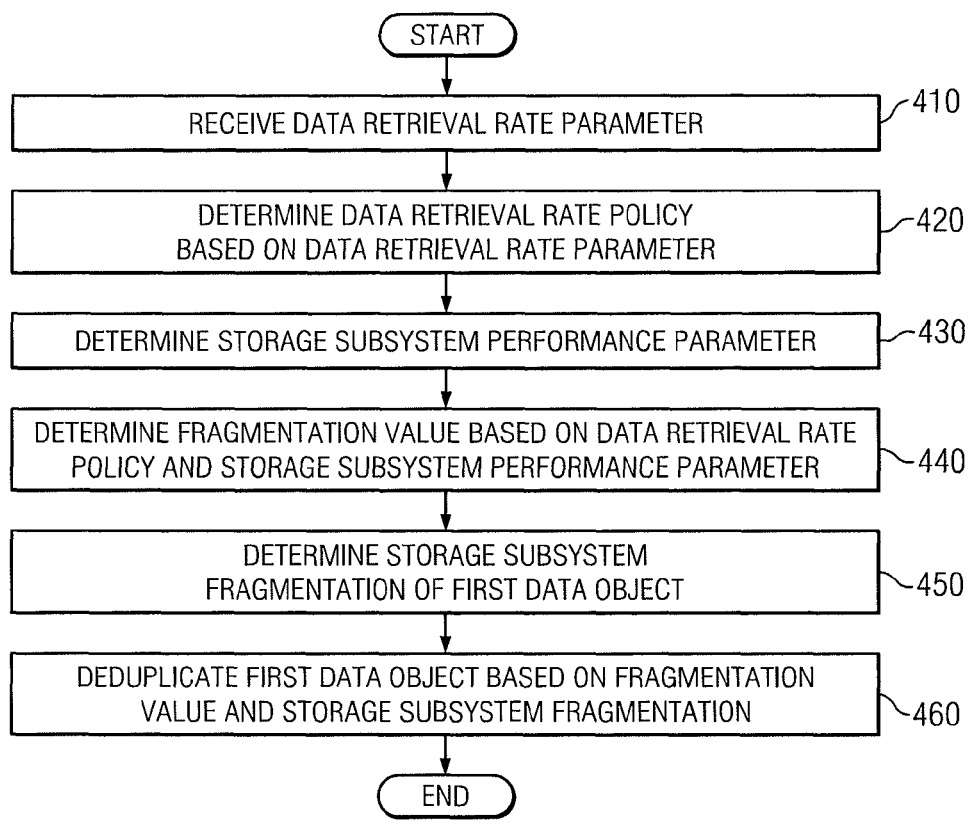
FIG. 4 illustrates an example method for deduplicating data that accounts for data retrieval rate parameters, in accordance with particular embodiments.

FIG. 4 illustrates an example method for deduplicating data that accounts for data retrieval rate parameters, in accordance with particular embodiments. The method begins at step 410 with the receipt of a data retrieval rate parameter. Depending on the embodiment and scenario, the data retrieval rate parameter may be received from a user, a predetermined or preconfigured data store, or any other suitable source. Depending on the embodiment, the data retrieval rate parameter may be any of a variety of values, such as, a maximum time allowed to retrieve a data object or a portion thereof, a minimum readback rate (e.g., bits per second), an abstract grade of service requirement, or any other value that may impact the performance with which data is retrieved.

At step 420, a data retrieval rate policy is determined based on the data retrieval rate parameter. Depending on the embodiment, the data retrieval rate policy may be applicable to each data object individually or collectively, in whole or in part. For example, in some embodiments, the data retrieval rate policy may ensure that the data retrieval rate of every data object is within the parameters of the data retrieval rate policy; in some embodiments, the data retrieval rate policy may ensure that the mean data retrieval rate of two or more data objects is within the parameters of the data retrieval rate policy; in some embodiments, the data retrieval rate policy may ensure that the data retrieval rate of an amount of data is within predetermined or specific data retrieval parameters.

At step 430, at least one storage subsystem performance parameter is determined. The storage subsystem performance parameter may include one or more of a variety of factors that may impact the rate at which data is retrieved from a data store. For example, the storage subsystem performance parameter may comprise an average data access latency (e.g., seek) time, a maximum (e.g., worst case scenario) data access latency time, a minimum data access latency time, an average data transfer rate, a minimum disk read speed, a maximum disk read speed, an average disk read speed, a minimum data transfer rate, a maximum data transfer rate, an average data transfer rate, or any other measure of speed, latency, delay, or throughput indicative of the performance of the storage subsystem.

At step 440, a fragmentation value is determined based on the data retrieval rate policy and the at least one storage subsystem performance parameter. The fragmentation value may be expressed in any of a variety of suitable formats. For example, in some embodiments, the fragmentation value may comprise the number of fragments into which a data object can be fragmented and still meet the parameters of the data retrieval rate policy. As another example, in some embodiments, the fragmentation value may comprise the number of fragments that can be created per megabyte while still meeting the parameters of the data retrieval rate policy. In some embodiments, the fragmentation value may comprise a fragmentation budget. The fragmentation budget may represent an amount of excess read capacity that is available for use in deduplication.

At step 450, storage subsystem fragmentation of a first data object is determined. The first data object is the data object that is being stored, transmitted, or processed, and for which deduplication is to be applied. The storage subsystem fragmentation comprises fragmenting the first data object in accordance with the specifications or parameters of the storage subsystem. For example, the storage subsystem may require data objects to be stored as data blocks of 10 megabytes or less. This may result in fragmenting the first data object into a number of data blocks with each fragment negatively impacting the data retrieval performance (e.g., latency to seek the next data block).

At step 460, the first data object is deduplicated based on the fragmentation value and storage subsystem fragmentation. In particular embodiments, deduplicating the first data object may comprise partitioning the first data object into a plurality of sub-blocks. The sub-blocks may then be assessed to determine and/or identify potential sub-blocks for deduplication. The identified potential sub-blocks may then be deduplicated to the extent that there is excess read capacity available. For example, if it were assumed the fragmentation value comprises the number of times a data object can be fragmented, each fragment of the first data object by the storage subsystem may reduce the available read capacity. The remaining capacity may be used to deduplicate as many sub-blocks as possible, within the constraints of the available read capacity. In particular embodiments, there may be a cost associated with each fragment, whether the fragment was created by the deduplication engine or the storage subsystem. In some embodiments, the cost may be static (e.g., based on a worst-case scenario). In some embodiments, the cost may vary (e.g., based on the physical distance between fragments). In some situations, adding a fragmentation to deduplicate a particular sub-block may incur two costs; one cost to seek the deduplicated data, and a second cost to return to the original data. If the cost to deduplicate a potential sub-block of data exceeds the available read capacity, then the sub-block may not be deduplicated (e.g., it is stored as though an identical or similar sub-block is not already present).

In some situations, the amount of excess read capacity may not allow all potential sub-blocks to be deduplicated. Accordingly, some embodiments may prioritize potential sub-blocks for deduplication. For example, those sub-blocks, or sub-sequences of sub-blocks, for which deduplication will provide a greater level of compression may have a higher priority. The deduplication engine may then deduplicate sub-blocks in their order of priority. Some embodiments may comprise a technique in which sub-blocks are selected in a manner that is statistically consistent with the goal of selecting sub-blocks resulting in greater compression. For example, in some embodiments, the deduplication process may use a queue that tracks the sub-blocks that are to be deduplicated. The queue may be sorted by, for example, hash values. Sub-blocks may then be taken from the queue and deduplicated together with sub-blocks that neighboring (e.g., in the original input ordering and/or some previous sequence against which deduplication is possible) the sub-block that was just taken from the queue. This may have the stochastic effect of processing those sub-blocks belonging to longer deduplicatable subsequences of sub-blocks before sub-blocks belonging to shorter such subsequences.

Although this disclosure describes and illustrates particular steps of the method of FIG. 4 as occurring, in a particular order, this disclosure contemplates any suitable steps of the method of FIG. 4 occurring in any suitable order. Although this disclosure describes and illustrates particular components carrying out particular steps of the method of FIG. 4, this disclosure contemplates any suitable components carrying out any suitable steps of the method of FIG. 4.

In particular embodiments, accounting for data retrieval rates allows data to be deduplicated without imposing unsuitable data retrieval delays. This may allow for data compression that is capable of meeting predetermined or specified policy parameters for data retrieval performance.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising, by one or more computer systems:
   determining a data retrieval rate policy based on at least one data retrieval rate parameter;
   determining at least one storage subsystem performance parameter;
   determining a fragmentation value based on the data retrieval rate policy and the at least one storage subsystem performance parameter;
   determining a storage subsystem fragmentation of a first data object, the storage subsystem fragmentation fragmenting the first data object into a plurality of first data object fragments; and
   deduplicating the first data object based on the fragmentation value and the storage subsystem fragmentation.

2. The method of claim 1, further comprising receiving a user specified data retrieval rate parameter.

3. The method of claim 1, wherein determining the at least one storage subsystem performance parameter comprises determining at least one of a data transfer rate associated with a storage subsystem and a data access latency time associated with the storage subsystem.

4. The method of claim 1, wherein:
   determining a fragmentation value comprises determining an excess read capacity budget based on the data retrieval rate policy and the at least one storage subsystem performance parameter; and
   the deduplicating of the first data object comprises:
      reducing the excess read capacity budget for by a first cost for each fragment of the plurality of first data object fragments; and
      determining a second cost associated with a deduplication of the first data object, wherein the first data object is deduplicated upon the second cost being less than or equal to the reduced excess read capacity budget.

5. The method of claim 4, wherein the first cost is based in part on an actual seek time for access between two of the plurality of first data object fragments as stored by the storage subsystem.

6. The method of claim 1, wherein deduplicating the first data object is further based on a priority associated with a plurality of potential deduplication sub-blocks.

7. The method of claim 1, wherein each fragmentation has a cost associated therewith, wherein:
   upon a fragmentation for a deduplication of the first data object occurring within a consecutive block of data, the cost comprises a seek time to the deduplicated data and a seek time to return to the consecutive block of data; and
   upon the fragmentation occurring at the end of one of the plurality of first data object fragments, the cost comprises a seek time to the next first data object fragment.

8. One or more computer-readable storage media embodying instructions that are operable when executed by one or more computer systems to:
   determine a data retrieval rate policy based on at least one data retrieval rate parameter;
   determine at least one storage subsystem performance parameter;
   determine a fragmentation value based on the data retrieval rate policy and the at least one storage subsystem performance parameter;
   determine a storage subsystem fragmentation of a first data object, the storage subsystem fragmentation fragmenting the first data object into a plurality of first data object fragments; and
   deduplicate the first data object based on the fragmentation value and the storage subsystem fragmentation.

9. The computer-readable storage media of claim 8, wherein the instructions are further operable to receive a user specified data retrieval rate parameter.

10. The computer-readable storage media of claim 8, wherein the instructions operable to determine the at least one storage subsystem performance parameter are further operable to determine at least one of a data transfer rate associated with a the storage subsystem and a data access latency time associated with the storage subsystem.

11. The computer-readable storage media of claim 8, wherein the instructions operable to:
   determine a fragmentation value are further operable to determine an excess read capacity budget based on the data retrieval rate policy and the at least one storage subsystem performance parameter; and
   deduplicate the first data object are further operable to:
      reduce the excess read capacity budget for by a first cost for each fragment of the plurality of first data object fragments; and
      determine a second cost associated with a deduplication of the first data object, wherein the first data object is deduplicated upon the second cost being less than or equal to the reduced excess read capacity budget.

12. The computer-readable storage media of claim 11, wherein the first cost is based in part on an actual seek time for access between two of the plurality of first data object fragments as stored by the storage subsystem.

13. The computer-readable storage media of claim 8, wherein the instructions operable to deduplicate the first data object are further operable to deduplicate the first data object based on a priority associated with a plurality of potential deduplication sub-blocks.

14. The computer-readable storage media of claim 8, wherein each fragmentation has a cost associated therewith, wherein:
   upon a fragmentation for a deduplication of the first data object occurring within a consecutive block of data, the cost comprises a seek time to the deduplicated data and a seek time to return to the consecutive block of data; and
   upon the fragmentation occurring at the end of one of the plurality of first data object fragments, the cost comprises a seek time to the next first data object fragment.

15. One or more computer-readable storage media embodying data that was stored on the media at least in part by:
   determining a data retrieval rate policy based on at least one data retrieval rate parameter;
   determining at least one storage subsystem performance parameter; determining a fragmentation value based on the data retrieval rate policy and the at least one storage subsystem performance parameter;
   determining a storage subsystem fragmentation of a first data object, the storage subsystem fragmentation fragmenting the first data object into a plurality of first data object fragments; and
   deduplicating the first data object based on the fragmentation value and the storage subsystem fragmentation.

16. The media of claim 15, wherein the data was stored on the media at least further in part by receiving a user specified data retrieval rate parameter.

17. The media of claim 15, wherein determining the at least one storage subsystem performance parameter comprised determining at least one of a data transfer rate associated with a storage subsystem and a data access latency time associated with the storage subsystem.

18. The media of claim 15, wherein:
  determining a fragmentation value comprised determining an excess read capacity budget based on the data retrieval rate policy and the at least one storage subsystem performance parameter; and
    deduplicating of the first data object comprised: reducing the excess read capacity budget for by a first cost for each fragment of the plurality of first data object fragments; and
    determining a second cost associated with a deduplication of the first data object, wherein the first data object is deduplicated upon the second cost being less than or equal to the reduced excess read capacity budget.

19. The media of claim 18, wherein the first cost is based in part on an actual seek time for access between two of the plurality of first data object fragments as stored by the storage subsystem.

20. The media of claim 15, wherein deduplicating the first data object was further based on a priority associated with a plurality of potential deduplication sub-blocks.

21. The media of claim 15, wherein each fragmentation had a cost associated therewith, wherein:
  upon a fragmentation for a deduplication of the first data object occurring within a consecutive block of data, the cost comprised a seek time to the deduplicated data and a seek time to return to the consecutive block of data; and
  upon the fragmentation occurring at the end of one of the plurality of first data object fragments, the cost comprised a seek time to the next first data object fragment.

* * * * *